United States Patent [19]

Adams

[11] Patent Number: 4,898,399
[45] Date of Patent: Feb. 6, 1990

[54] TRAILER ASSEMBLY AND METHOD

[75] Inventor: Charles R. Adams, El Paso, Tex.

[73] Assignee: Aramar Inc., El Paso, Tex.

[21] Appl. No.: 248,626

[22] Filed: Sep. 26, 1988

[51] Int. Cl.$^4$ .................... B62D 53/00; B62D 53/10; B60J 5/12

[52] U.S. Cl. .................................. 280/408; 280/403; 280/432; 280/433; 280/476.1

[58] Field of Search ................... 280/411 R, 408, 403, 280/410, 411, 475, 476.1, 432, 433

[56] References Cited

U.S. PATENT DOCUMENTS

| | | | |
|---|---|---|---|
| 3,151,880 | 10/1964 | Black | 280/408 |
| 3,328,051 | 6/1967 | Hope et al. | 280/432 |
| 3,556,560 | 1/1971 | Adams | 280/432 X |
| 3,637,236 | 1/1972 | Shimoji et al. | 280/408 X |
| 3,874,699 | 4/1975 | Hayes et al. | 280/432 |
| 4,030,171 | 6/1977 | Arguin | 280/408 |
| 4,526,395 | 7/1985 | Arguin | 280/408 |
| 4,778,193 | 10/1988 | Torcomian | 280/403 |

*Primary Examiner*—Mitchell J. Hill
*Attorney, Agent, or Firm*—Victor Flores; Harry M. Weiss

[57] ABSTRACT

A trailer assembly including a cab, a first trailer hitched to the cab, a second trailer having a dolly hitched to the first trailer, and a third trailer having a dolly hitched to the second trailer. Each dolly has a framework with a front hitch and has a wheel assembly fixedly connected to the framework. The wheel assembly has an axle and four wheels and leaf springs. The dolly has a thrust bearing unit with a bearing axis. The thrust bearing unit has a bottom race fixedly connected to the framework and has a top race angularly displacable relative to the bottom race about the bearing axis. The top race has a pivot plate with a horizontal pivot axis. The pivot plate has trunnions with pivot pins for pivoting of the pivot plate about the horizontal pivot axis relative to the top race. The pivot plate has a hinge groove for connecting to a hinge pin under the overlapping trailer. The thrust bearing unit has brake means, operated by a driver in the cab by controlling a fluid meter. The brake means has a brake disc fixedly connected to the top race, and has a brake shoe fixedly connected to the framework. The pivot plate has a latching groove and a spring-biased lock pin for latching the pivot plate to the underside of its overlapping trailer. The first, second and third trailers each have a pair of front doors with respective hinged rear platforms in order to load all trailers at the same time from a loading platform through the third trailer rear door opening.

7 Claims, 5 Drawing Sheets

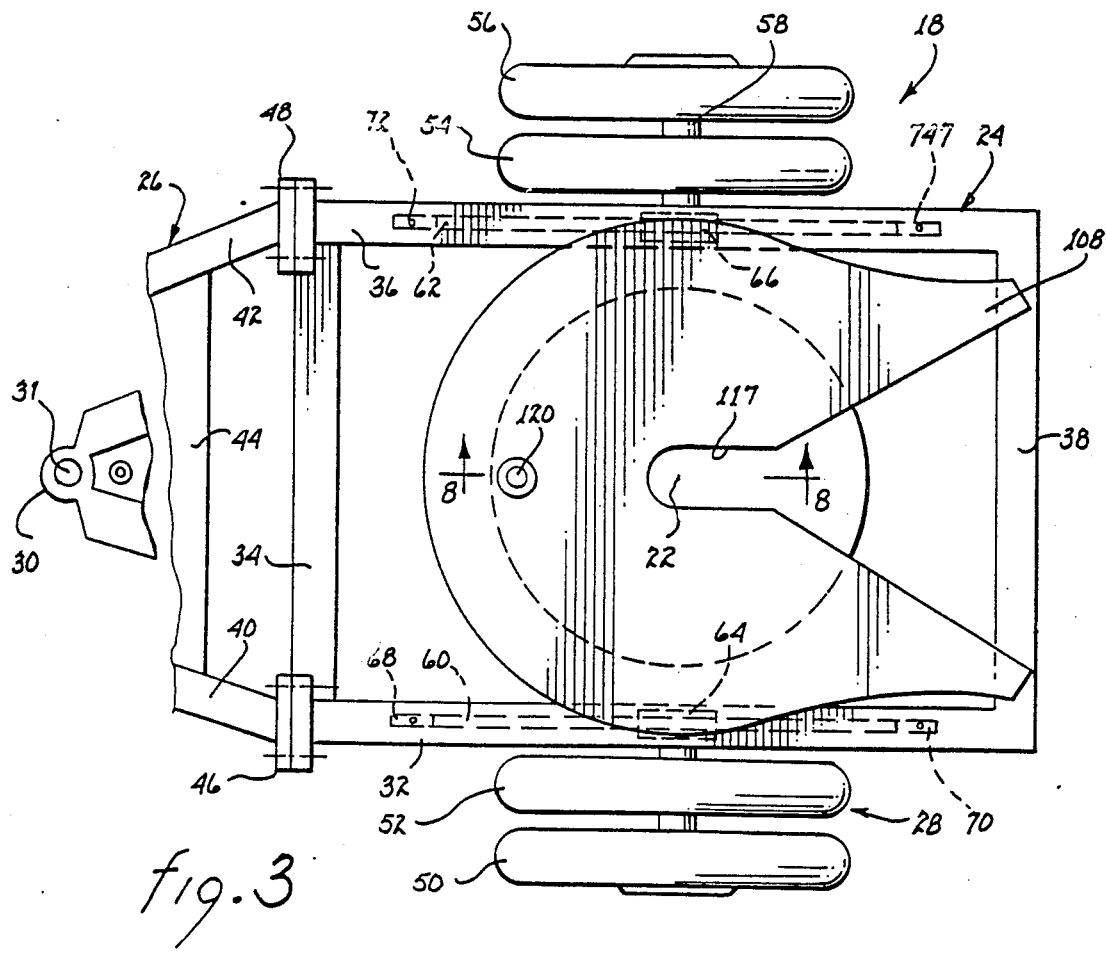
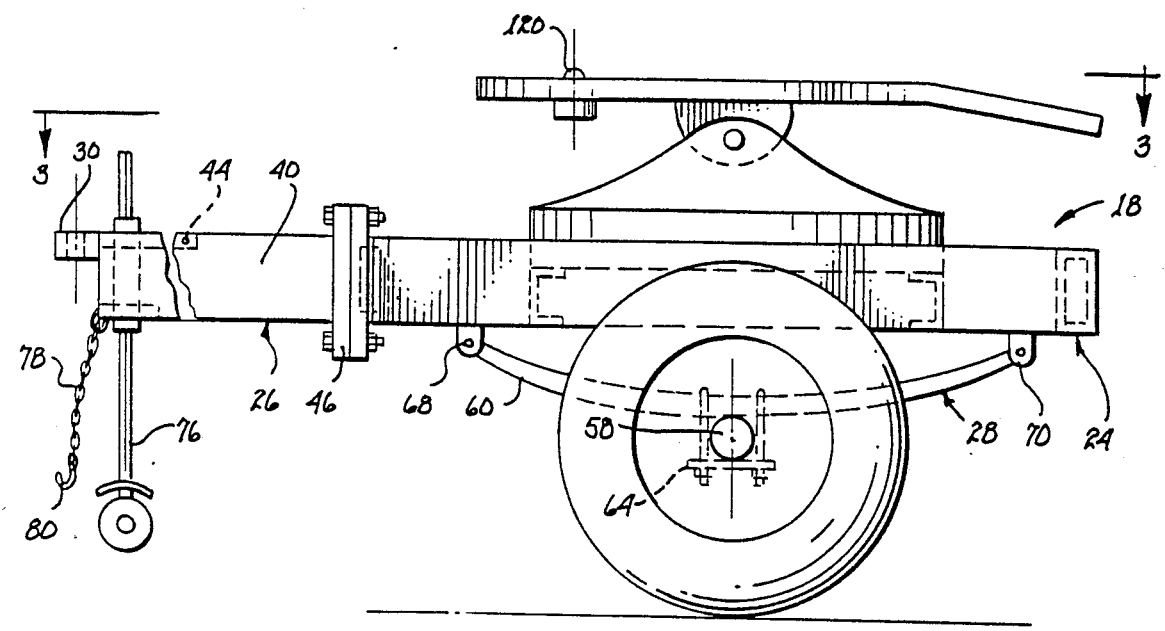

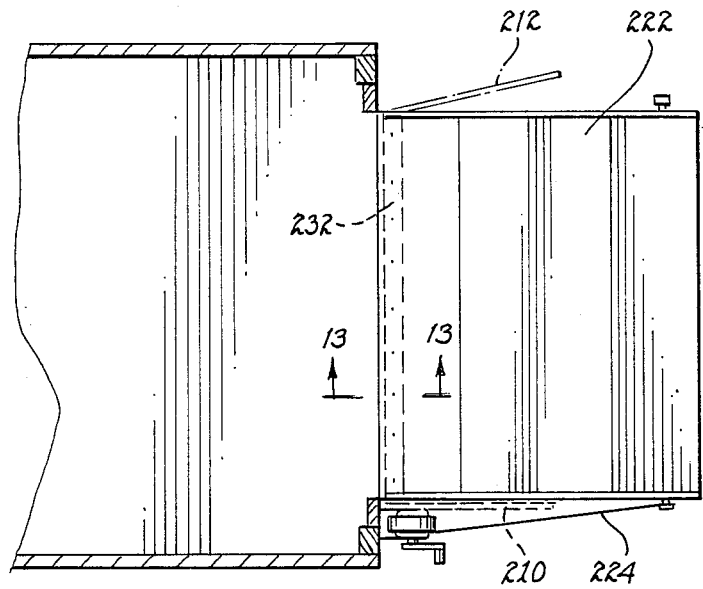
fig. 12
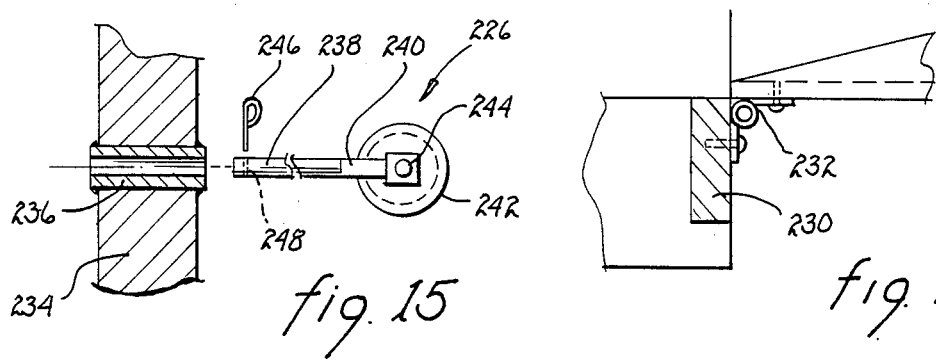
fig. 15
fig. 13
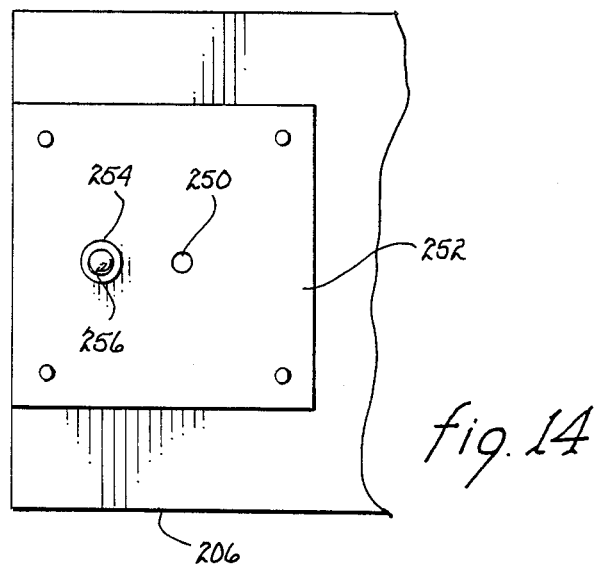
fig. 14

TRAILER ASSEMBLY AND METHOD

BACKGROUND OF THE INVENTION

1. Field of the Invention

The invention generally relates to a trailer assembly and method, and, in particular, the invention relates to a trailer assembly and method having a cab and having a first trailer which is connected to the cab and having a second trailer which has a dolly that is connected to the first trailer and that has a fifth wheel with a driver controlled brake means for control of the second trailer, and having a third trailer which has a dolly that is connected to the second trailer and that has a fifth wheel with a driver controlled brake means for control of the third trailer.

2. Description of the Related Art

The prior art trailer assembly includes a cab, a first trailer pivotally connected to the cab, and a second trailer which has a dolly pivotally connected to the first trailer, and a third trailer which has a dolly pivotally connected to the second trailer.

One problem with the prior art trailer assembly is that a driver in the cab has difficulty in preventing a jack-knife action and in controlling the angle of turn of the second trailer and the angle of turn of the third trailer relative to the cab and relative to the first trailer. The prior art trailer assembly is shown in U.S. Pat. No. 3,556,560, issued Jan. 19, 1971 to inventor C. R. Adams who is the inventor of this patent application. Related patents include U.S. Pat. Nos. 2,667,364 issued Jan. 26, 1954; 2,692,145 issued Oct. 19, 1954; 2,804,314 issued Aug. 27, 1957; 3,332,706 issued July 25, 1967 and 4,300,785 issued Nov. 17, 1981.

SUMMARY OF THE INVENTION

According to the present invention, a trailer assembly is provided. This trailer assembly comprises a cab, a first trailer pivotally connected to the cab, and a second trailer, which has a dolly pivotally connected to the first trailer, and a third trailer which has a dolly pivotally connected to the second trailer, wherein each dolly has a fifth wheel, thrust bearing means having a vertical axis and having a pivot plate with a horizontal axis and wherein each dolly has disc-type brake means for controlling the turning of its respective trailer about its bearing vertical axis, and wherein the cab has a unitary brake control means.

By using the fifth wheel, thrust bearing means and the disc-type brake means and the unitary brake control means, the difficulty of controlling the angle of turn of the second trailer, and the angle of turn of the third trailer relative to the cab and relative to the first trailer is minimized.

The foregoing and other objects, features and advantages will be apparent from the following description of the preferred embodiment of the invention as illustrated in the accompanying drawings.

BRIEF DESCRIPTION OF THE DRAWINGS

FIG. 2 is a section view as taken along the line 2—2 of FIG. 1;

FIG. 3 is a section view as taken along the line 3—3 of FIG. 2;

FIG. 12 is a section view as taken along the line 12—12 of FIG. 11;

FIG. 13 is a section view as taken along the line 13—13 of FIG. 12;

FIG. 14 is a section view as taken along the line 14—14 of FIG. 11; and

FIG. 15 is an exploded section view of a portion of FIG. 12;

DESCRIPTION OF THE PREFERRED EMBODIMENT

Figure 1:
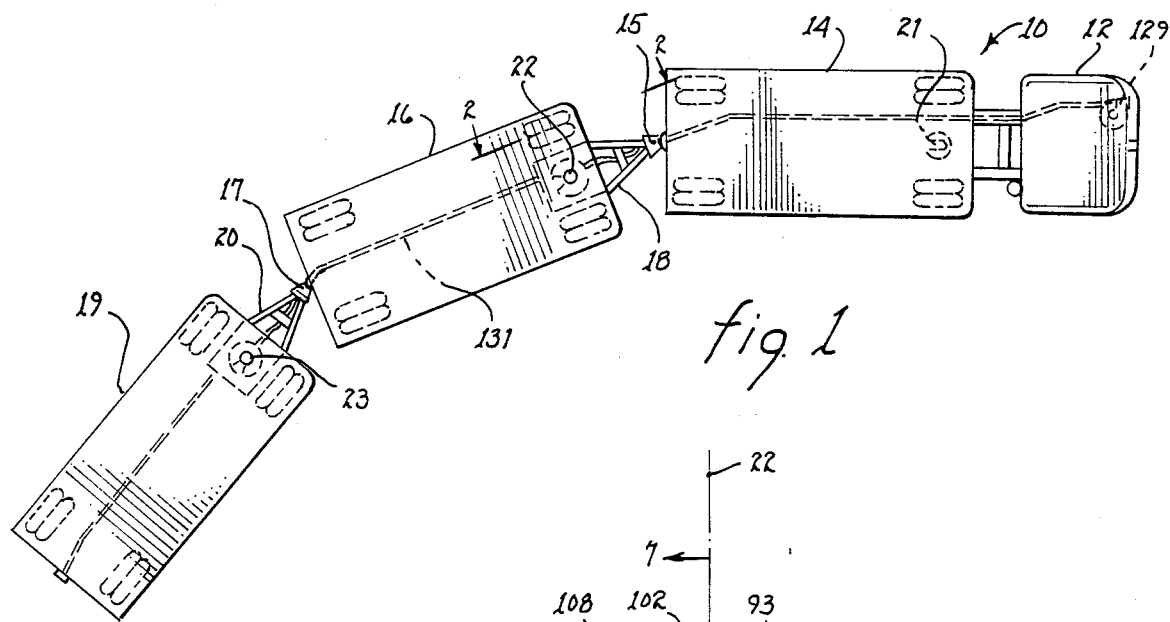
FIG. 1 is a schematic plan view of a trailer assembly according to the invention.

As shown in FIG. 1, a trailer assembly 10 is provided according to the invention. Trailer assembly 10 includes a cab 12, a first trailer 14, a second trailer 16 with a dolly 18, and a third trailer 19 with a dolly 20. First trailer 14 has a hinge axis 21. Second trailer 16 has a hinge axis 22. Third trailer 19 has a hinge axis 23. Dolly 18 has a hitch axis 15; and dolly 20 has a hitch axis 17.

In FIGS. 2 and 3, dolly 18, which is identical to dolly 20, is shown in plan view. Dolly 18 includes a rear frame subassembly 24, a front triangular subassembly 26, and a wheel subassembly 28, which is disposed under rear frame portion 24. Triangular subassembly 26 has a hitch means 30 for limited angular displacement about its own vertical axis 31.

In FIGS. 2 and 3 rear frame subassembly 24 has four structural box members 32, 34, 36, 38, which are butt welded at their end portions to form a rectangular frame in plan view. Triangular subassembly 26 has two diagonal box members 40, 42, which are also butt welded at their front end portions. Triangular subassembly 26 also has a transverse bracing plate 44, which is butt welded at its ends to diagonals 40, 42. Diagonals 40, 42 have respective bolted fielded joints 46, 48 at their rear end portions, as shown in FIGS. 2 and 3.

In FIGS. 2 and 3, wheel assembly 28 has four wheels 50, 52, 54, 56, two wheels on each side; and has an axle 58. Wheel assembly 28 has a pair of springs 60, 62 and a pair of brackets 64, 66, which are disposed at the center portions of springs 60, 62 for connecting axle 58 to springs 60, 62.

Springs 60, 62 have respective pivot units 68, 70 and 72, 747 at their outer ends that are connected to respective frame members 32, 36.

In FIG. 2, dolly 18 has a conventional support post 76 for temporary resting, and has a conventional safety chain 78 with a hook 80.

Figure 6:
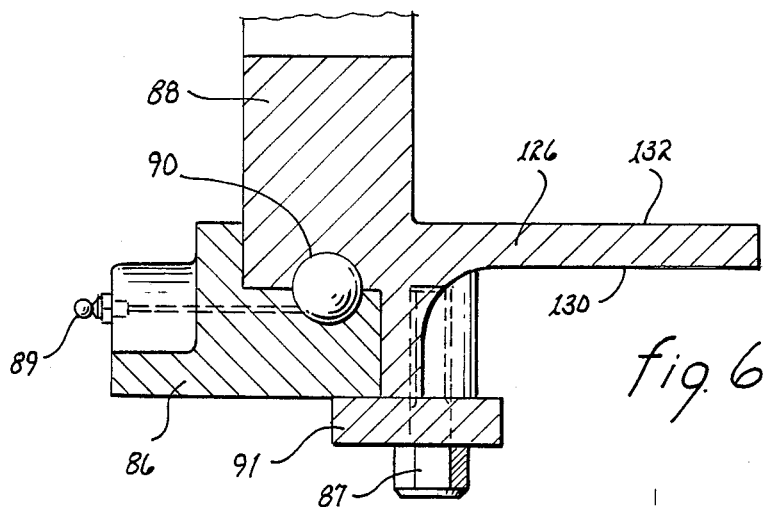
FIG. 6 is a section view as taken along the line 6—6 of FIG. 4.

In FIGS. 4, 5, 6 and 7, dolly 18 has a thrust bearing unit 82 for angular displacement about a bearing axis 84, which is coaxial with axis 22. Thrust bearing unit 82 includes a bottom race 86, a top race 88 and a plurality of bearing balls 90. Bottom race 86 has grease fittings 89. Top race 88 has clamp plates 91 with respective bolts 87, as shown in FIG. 6.

Figure 4:
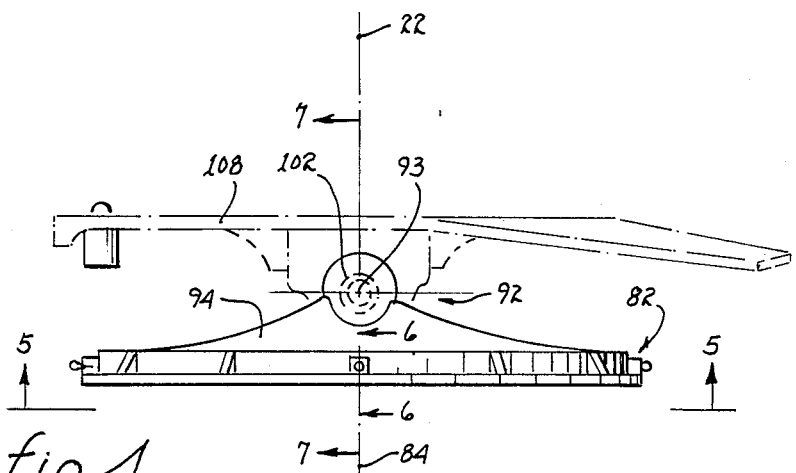
FIG. 4 is a detailed view of a portion of FIG. 2.
Figure 5:
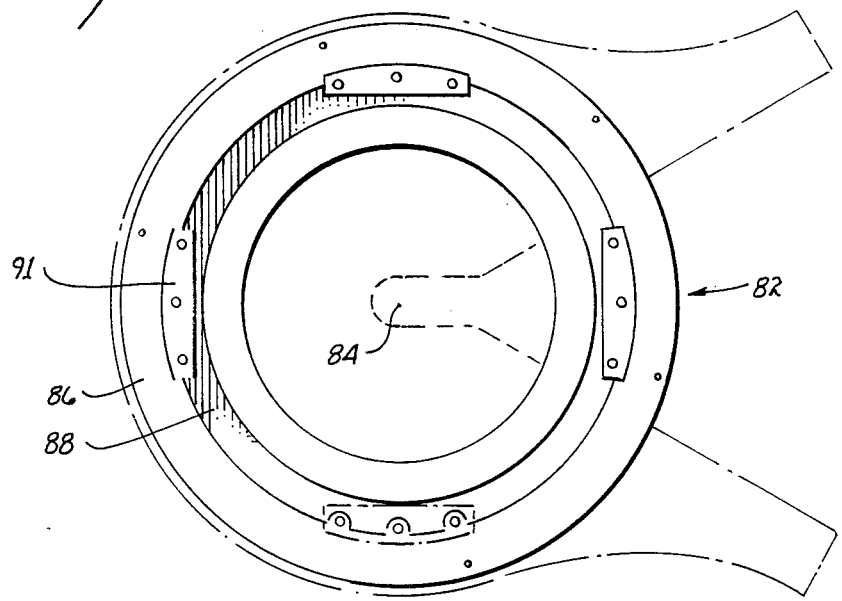
FIG. 5 is a section view as taken along the line 5—5 of FIG. 4.
Figure 7:
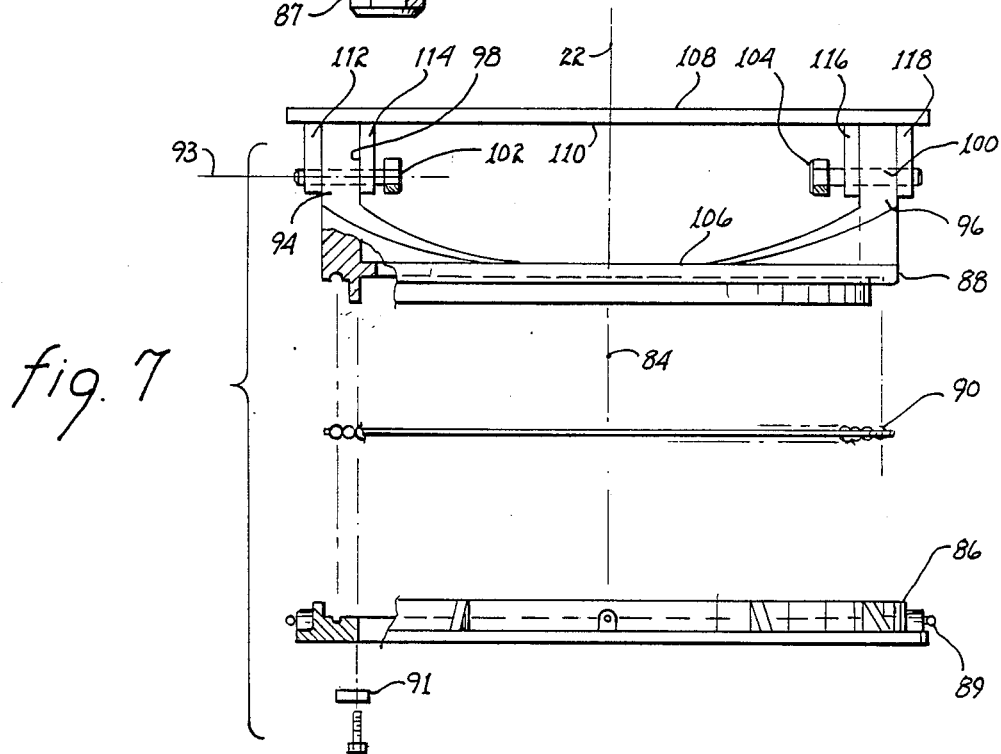
FIG. 7 is an exploded section view as taken along the line 7—7 of FIG. 4.

In FIGS. 4 and 7, a pivot unit 92 for pivoting of second trailer 16 relative to dolly 18 about a horizontal axis 93 is provided. Pivot unit 92 has a pair of projections 94, 96 with respective holes 98, 100 for pivot pins 102, 104. Projections 94, 96 are fixedly connected to top race 88 at its upper face 106, as shown in FIG. 7.

Figure 8:
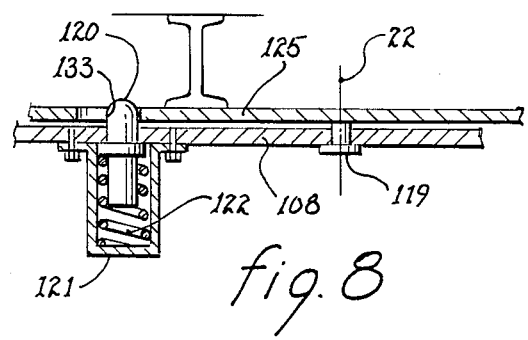
FIG. 8 is a section view as taken along the line 8—8 of FIG. 3.

In FIG. 7, which is an exploded section view, pivot unit 92 also has a top pivot plate 108 which has an underside surface 110 that has four projections 112, 114 and 116, 118, with holes that receive respective pins 102, 104. In FIGS. 3 and 8, top pivot plate 108 has a groove 117, which receives a hinge pin 119 that is fixedly connected to trailer 16, for latching top pivot plate 108 to trailer 16.

In FIG. 8, top pivot plate or latching plate 108 has a lock dowel or pin 120 which is supported by cylinder 121 and which is urged by spring 122 to a locked position A hole 133 in a bed plate 125, which is fixedly connected to trailer 16, receives lock pin 120 in the locked position. Pin 120 can be moved to an unlocked position by pushing down with a tool on pin 120 while turning plate 108 relative to plate 125 about axis 22.

Figure 9:
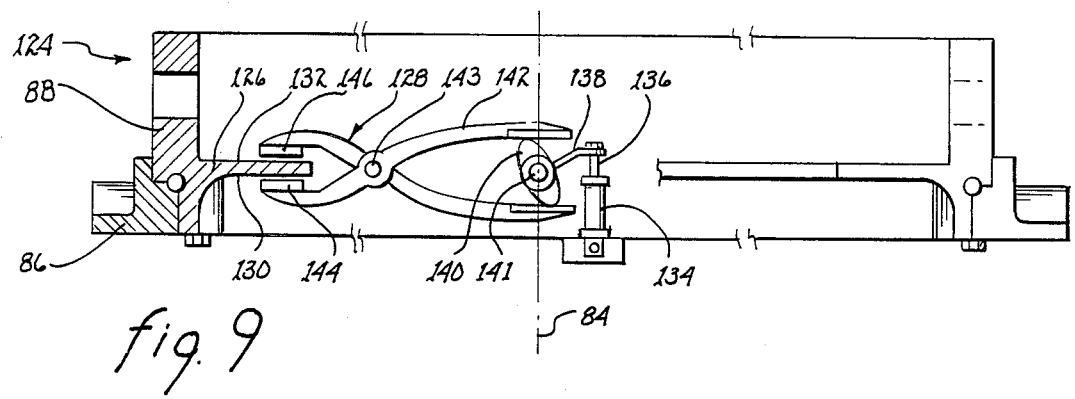
FIG. 9 is a schematic section view of a portion of FIG. 7.

In FIG. 9, top race 88 has a disc brake means 124. Brake 124 has an annular disc 126, which is integral with top race 88 and which is coaxial therewith about axis 84. Brake 124 has brake shoe means 128 for acting on disc 126 for braking the turning of top race 88 relative to bottom race 86. In FIG. 1, brake shoe 128 has a metering valve 129, which is located in cab 12 and a fluid line means 131 to both trailers 16, 19 for controlling the pressure on brake disc 126 in each trailer. In this way, brake 124 of trailer 16 and the brake of trailer 19 can be braked simultaneously for better drive control of second trailer 16 and third trailer 19. In FIG. 9, disc 126 has a bottom brake surface 130 and a top brake surface 132, which are machined surfaces for better braking action.

In FIG. 9, brake shoe 128 includes a cylinder 134 which connects to fluid line 131, a piston 136 received in cylinder 134, a lever 138 which is actuated by piston 136, a cam 140 which is actuated by lever 138, and a brake pad actuator 142 which is actuated by cam 140 and which actuates brake pads 144, 146. Cam 140 and actuator 142 have respective pivot pins 141, 143, which are supported by frame subassembly 24. Cylinder 134 is supported by frame subassembly 24.

Figure 10:
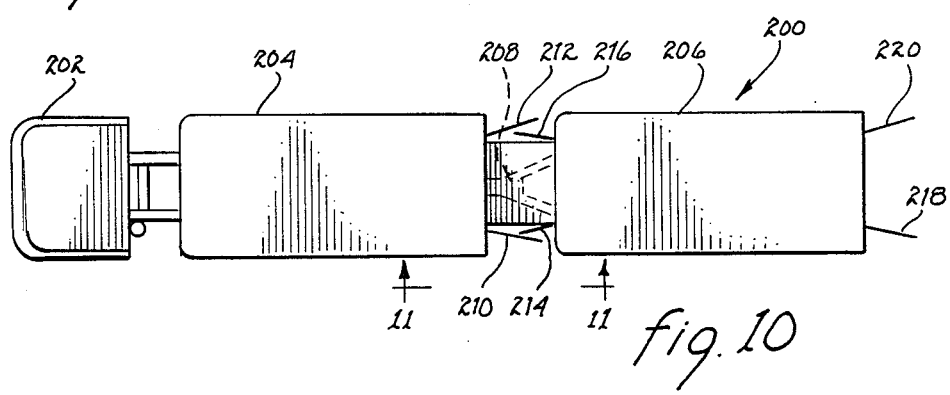
FIG. 10 is a schematic plan view of a second embodiment of a trailer assembly according to the invention.

In FIG. 10, a second embodiment, or trailer assembly 200, is shown. Trailer assembly 200 has a cab 202, a first trailer 204, and a second trailer 206 with a dolly 208. Dolly 208 is the same construction as dolly 18 of the first embodiment 10.

First trailer 204 has two rear doors 210, 212. Second trailer 206 has two front doors 214, 216. Second trailer 206 has two rear doors 218, 220.

Figure 11:
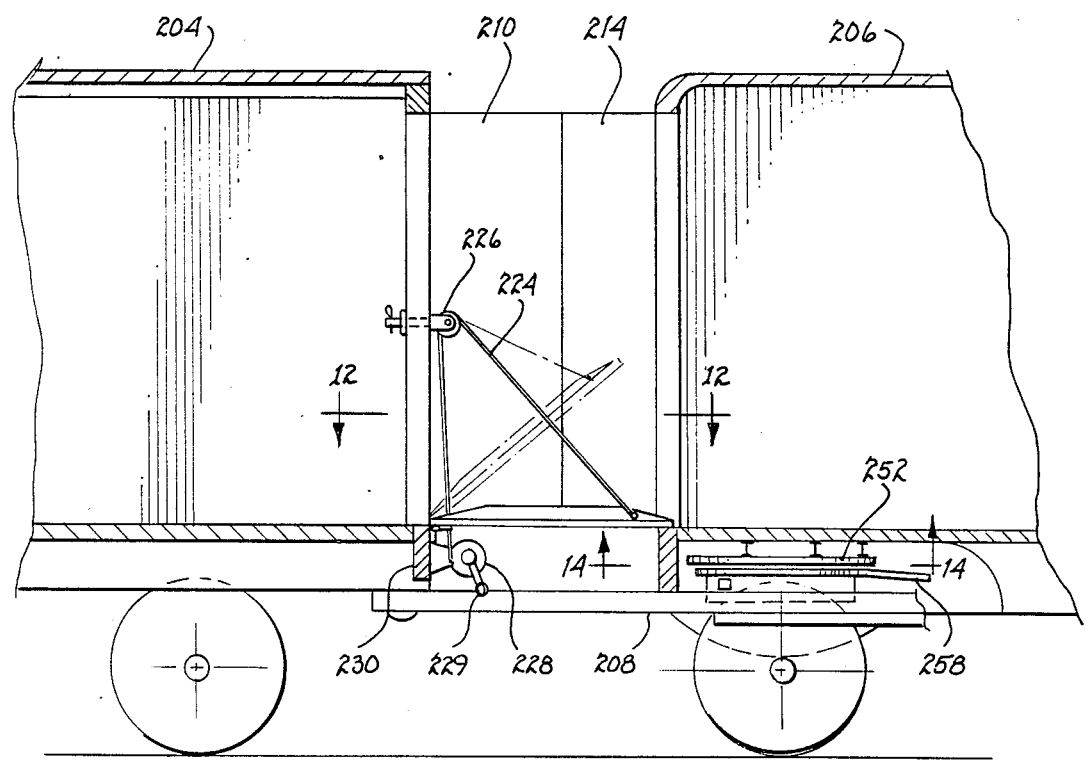
FIG. 11 is a section view as taken along the line 11—11 of FIG. 10.

In FIGS. 11 and 12, first trailer 204 has a rear platform 222. Platform 222 has a guy wire 224 which runs through a pulley unit 226, and which is connected to a winch 228 that has a handle 229. First trailer 204 has a transverse beam 230, which is disposed under doors 210, 212. Winch 228 is fixedly mounted on transverse beam 230. When doors 210, 212 and 214, 216 are in a closed position, rear platform 222 is lowered by unwinding winch 228 to play out guy wire 224. After the door 210, 212 and 214, 216 are opened, platform 222 rests on the floor of second trailer 206.

Trailers 204, 206 can be loaded using a wheel barrow, or fork lift truck, or a like loading vehicle. Such loading vehicle can move from a loading platform, through a second trailer opening at rear doors 218, 220, through second trailer 206, through a second trailer opening at front doors 214, 216, across rear platform 222, through a first trailer opening at rear doors 210, 212 and through first trailer 204.

In FIGS. 12 and 13, rear platform 222 has an elongate hinge 232, which is attached to rear transverse beam 230.

In FIG. 15, pulley unit 226 includes a cylinder 236 which is mounted on a rear door side jamb 234. Pulley unit 226 has a rod 238, which has a Y-shaped portion 240, that supports a wheel shaft 244 of a pulley wheel 242. Rod 238 has a lock pin 246, which extends through a hole 248 in rod 238. Rod 238 is received in cylinder 236. Lock pin 246 bears against the inner surface of cylinder 236 in its assembled condition, as shown in FIG. 11.

In FIG. 14, trailer 206 has a hinge pin 250, which is fixedly connected to trailer plate 252. Plate 252 has a hole 254, which receives a spring biased lock pin 256 that is supported by top pivot plate 258 of dolly 208.

The advantages of the invention are indicated hereafter:

First, a trailer 16 can be easily assembled to its dolly which is hitched to a trailer 14, because the trailer hinge pin 119 is received in groove 117 of dolly top pivot plate 108 by backing up trailer 14, and because the spring biased lock pin 120 of top pivot plate 108 is received into hole 133 of bed plate 125 of trailer 16, when trailers 14 and 16 are aligned longitudinally.

Second, a series of trailers 204, 206 can be easily loaded by a fork lift truck or the like, because material can be carried on the fork lift truck from a loading platform, through open doors 218, 220 and 214, 216 and 210, 212 to trailers 204, 206.

Third, trailer assembly 10 is easier to control by a driver than the prior art trailer assembly because the pressure on brake disc 126 by brake shoe 128 in each trailer is easily metered by the driver in the cab 12.

Fourth, trailer assembly 10, which has first and second and third trailers 14, 16, 19 is much safer to operate than the prior art trailer assembly, which has first and second and third trailers, because first brake means 124 of second trailer 16 acts simultaneously with the second brake means of third trailer 19.

Fifth, dolly 18 can be shifted in relatively small places and installed in existing trailers, because it is easily assembled from the three subassemblies, including frame subassembly 24, front triangular subassembly 26, and wheel subassembly 28.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A trailer assembly including a cab, and a plurality of trailer units pivotally interconnected in tandem using a plurality of dolly members, said assembly comprising:

thrust bearing assembly provided on each of said plurality of dolly members, said thrust bearing assembly having a bottom race member, a top race member, a top pivot plate member and a disc brake member, said top pivot plate member being pivotally connected to said top race member and having a spring biased lock pin assembly and a grooved portion, said spring biased lock pin assembly and said grooved portion being used for mechanically communicating in an alignment relationship with a bed plate fixedly provided on each of said plurality of trailer units, said bed plate having a hole for receiving a locking pin member of said spring biased lock pin assembly and a hinge pin for being positioned within said grooved portion, said top race member having an annular disc portion for providing a braking surface for said disc brake member and, said cab having a unitary brake control means, including a metering valve for controlling actuation of said disc brake member on each of said thrust bearing assembly on each of said plurality of dolly members.

2. A trailer assembly as recited in claim 1, wherein said assembly further comprises;

said plurality of tandemly interconnected trailer units having front and rear doors that enable loading from one trailer unit to another and a winch controlled, hinged platform member at a rear portion of a first trailer units for resting on a front floor portion of a second trailer unit.

3. A trailer assembly as recited in claim 1, wherein:

said top race member pivots horizontally about said bottom race member and said top pivot plate member pivots vertically about pivot pins securing said top pivot plate member to said top race member.

4. A method of providing a trailer assembly, said method comprising the steps of:

(a) providing a trailer assembly having a cab and a plurality of trailer units pivotally interconnected in tandem using a plurality of dolly members, said trailer assembly comprising:

thrust bearing assembly provided on each of said plurality of dolly members, said thrust bearing assembly having a bottom race member, a top race member, a top pivot plate member and a disc brake member, said top pivot plate member being pivotally connected to said top race member and having a spring biased lock pin assembly and a grooved portion, said spring biased lock pin assembly and said grooved portion being used for mechanically communicating in an alignment relationship with a bed plate fixedly provided on each of said plurality of trailer units, said bed plate having a hole for receiving a locking pin member of said spring biased lock pin assembly and a hinge pin for being positioned within said grooved portion said top race member having an annular disc portion for providing a braking surface for said disc brake member and, said cab having a unitary brake control means, including a metering valve for controlling actuation of said disc brake member on each of said thrust bearing assembly on each of said plurality of dolly members; and (b) providing said thrust bearing assembly having: said top race member pivoting horizontally about said bottom race member and said top pivot plate member pivoting vertically about pivot pins securing said top pivot plate member to said top race member.

5. A method of providing a trailer assembly as recited in claim 4, wherein said step of providing a trailer assembly includes:

providing said plurality of tandemly interconnected trailer units having front and rear doors that enable loading from one trailer unit to another and a winch controlled, hinged platform member at a rear portion of a first trailer units for resting on a front floor portion of a second trailer unit.

6. A dolly apparatus for interconnecting trailer units being pulled by a cab, said dolly apparatus comprising:

thrust bearing assembly, said thrust bearing assembly having a bottom race member, a top race member, a top pivot plate member and a disc brake member, said top pivot plate member being pivotally connected to said top race member and having a spring biased lock pin assembly and a grooved portion, said spring biased lock pin assembly and said grooved portion being used for mechanically communicating in an alignment relationship with a bed plate fixedly provided on trailer units being interconnected, said bed plate having a hole for receiving a locking pin member of said spring biased lock pin assembly and a hinge pin for being positioned within said grooved portion, said top race member having an annular disc portion for providing a braking surface for said disc brake member.

7. A dolly apparatus as recited in claim 6, wherein:

said top race member pivots horizontally about said bottom race member and said top pivot plate member pivots vertically about pivot pins securing said top pivot plate member to said top race member.

* * * * *